(12) United States Patent
Prabhakara et al.

(10) Patent No.: US 8,311,330 B2
(45) Date of Patent: Nov. 13, 2012

(54) METHOD FOR THE LOGICAL SEGMENTATION OF CONTENTS

(75) Inventors: Jagadeesh Chandra Bose Rantham Prabhakara, Andhra Pradesh (IN); Sangeetha Rao, Bangalore (IN); Anitha Chandran, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 407 days.

(21) Appl. No.: 12/754,240

(22) Filed: Apr. 5, 2010

(65) Prior Publication Data

US 2010/0254604 A1    Oct. 7, 2010

(30) Foreign Application Priority Data

Apr. 6, 2009    (IN) .......................... 919/MUM/2009

(51) Int. Cl.
*G06K 9/34*    (2006.01)
(52) U.S. Cl. ....................... 382/173; 382/176; 382/180
(58) Field of Classification Search .................. 382/173, 382/176, 180; 715/200, 205, 230, 234; 707/737, 707/748, 754, 999.107
See application file for complete search history.

(56) References Cited

U.S. PATENT DOCUMENTS

| | | | | |
|---|---|---|---|---|
| 7,581,170 B2 * | 8/2009 | Baumgartner et al. | ....... | 715/234 |
| 7,660,819 B1 * | 2/2010 | Frieder et al. | .......... | 707/999.107 |
| 7,689,037 B2 * | 3/2010 | Handley et al. | ............... | 382/173 |
| 7,860,312 B2 * | 12/2010 | Handley et al. | ............... | 382/173 |
| 7,965,891 B2 * | 6/2011 | Handley et al. | ............... | 382/173 |
| 8,131,724 B2 * | 3/2012 | Frieder et al. | ................. | 707/737 |

OTHER PUBLICATIONS

"Semantic Analysis (Machine Learning), Wikipedia," http://en.wikipedia.org/wiki/Semantic_Analysis_(Machine_Learning) Modified Oct. 6, 2008.
"Latent Semantic Analysis", Wikipedia, "http://en.wikipedia.org/wiki/Latent_semantic_analysis", modified Jan. 30, 2009.
"Latent Dirichlet allocation", Wikipedia, "http://en.wikipedia.org/wiki/Latent_Dirichlet_allocation", modified Jan. 9, 2009.

* cited by examiner

*Primary Examiner* — Anh Hong Do
(74) *Attorney, Agent, or Firm* — Vedder Price PC

(57) ABSTRACT

A document to be segmented is converted into a common representation format, if necessary. Parsing of the document results in a document model that is analyzed based on at least one structure-dependent function to identify segments within the document. In one embodiment, the structure-dependent function may comprise a template, or a best-fit template of a plurality of templates, used for comparison with the document model. In other embodiments, the structure-dependent function may comprise table of contents information, font properties within the document model and/or an average segment size determined according to previously identified segments in one or more additional documents that are related to the document under consideration. Semantic-content dependent functions may be applied to further refine the analysis by identifying sub-segments within the extracted segments, or by identifying segments that may be properly merged according to the similarity of their respective semantic content.

22 Claims, 4 Drawing Sheets

- PRIOR ART -

METHOD FOR THE LOGICAL SEGMENTATION OF CONTENTS

FIELD OF THE INVENTION

The instant disclosure relates generally to document segmentation and, in particular, to techniques for determining such segments based on structure-dependent functions. The present invention also provides apparatus that can be used for implementing the said document segmentation technique.

BACKGROUND OF THE INVENTION

Repositories for documents are well known in the art. Within such repositories, literally thousands of documents of various types—text, spreadsheets, presentations, diagrams, ad hoc databases, programming code, etc.—maybe stored according to any desired hierarchy. Given the sheer quantity of documents within such repositories, it is desirable to provide systems and techniques for navigating within the repositories. For example, U.S. Patent Application Publication No. U.S. 2005/00659930 filed on Sep. 12, 2003 in the name of Swaminathan et al. and entitled "Navigating A Software Project Repository" ("the '930 application") describes a repository navigation tool comprising a backend system for processing documents in a repository and a front end system for accessing the processed documents. FIG. 1 illustrates the backend system of the repository navigation tool system described in the '930 application. As shown, the backend system 100 extracts relevant files from the various project repositories 110 using repository adapters 121. The extracted files are treated by the extraction tool 120 as essentially uniform materials, that are subsequently stored in a file store 125.

As shown, the extraction tool 120 communicates with a classification tool 130, a segmentation tool 140, and a linking tool 150. The classification tool 130 operates to classify each document provided by the extraction tool 120 into one of a plurality of categories. In turn, the segmentation tool 140 divides the extracted and classified documents into one or more segments. As used herein, and as further described in the '930 application, a segment of a document comprises a subset of information that is grouped in some distinguishable and well-delineated manner from surrounding information such that the segmentation tool 140 is able to discern an author's intent to communicate to a reader that the subset of information may be treated as a single, discrete piece of information. Further still, the linking tool 150, is operative to analyze the resulting segments for the existence of relationships between the various segments, and subsequently store information concerning the discovered relationships in a link repository 155. Based on the links established in this manner, the front end system illustrated and described in the '930 application may be used to identify documents that are related to each other by virtue of similarity of their corresponding segments.

The '930 application describes a particular technique for operation of the segmentation tool 140. In particular, the '930 application describes segmentation of documents based on structure of a document associated with that document's specific type, as well as the content of the document. For example, in the case of a Word document (i.e., a document produced using Microsoft's "WORD" text editor application), the segmentation tool 140, using a so-called component object model (COM) application protocol interface (API), accesses the content of a document to discover various structural feature specific to a Word document, e.g., titles, outline levels, section indicia and the relationship of various paragraphs to these structures. Based on this information, the segmentation tool 140 infers the existence of segments consisting of text associated with the high level structural features such as sections. In another example, slides within a presentation developed using Microsoft's "POWERPOINT" application are accessed via a corresponding COM API to determine the existence of various slides, shapes and shape text within the document, which features are again used to infer segments. In the case of documents developed according to templates, the segmentation tool 140 is provided with an additional tool for determining segments to the extent that the known structure of the template can be used to segment boundaries.

Other approaches to segmentation employ more trivial means such as segmenting documents into fixed sized units or segmenting into minimal entities (such as paragraphs) and then grouping subsequent paragraphs based on similarity to create the segments. In the former approach, the segments thus formed may not be as expected by the user (they can be either too large or small) and clearly doesn't take the user's perspective into consideration. With regard to the latter approach, the computational complexity required to first interpret the semantic content of each minimal entity, and subsequently infer similarity between minimal entities, is very high.

While the segmentation approach described in the '930 application, as well as the other techniques described above, have been useful additions to the prior art, further refinements for performing segment identification would represent an advancement in the art.

SUMMARY OF THE INVENTION

The instant disclosure describes various methods for segmenting documents based on one or more structure-dependent functions. In one embodiment, a document to be segmented (i.e., at least logically, if not physically, divided into two or more segments) is converted into a common representation format, if necessary. The common representation format supports discovery of internal structure of the document through parsing that results in a document model. The document model is then analyzed based on at least one structure-dependent function to identify segments within the document. A structure-dependent function may comprise any rule for identifying a segment within a document that relies upon structural features of the document, as represented by the document model, when making segmentation decisions. In contrast, semantic-content dependent functions comprise rules for identifying segments that are dependent upon the literal meaning of content (i.e., how a human reader of the document would understand or interpret the content) within the document.

In one embodiment, the structure-dependent function may comprise a template used for comparison with the document model. In this embodiment, matching properties between the document model and a template are used to identify segments. Furthermore, where a plurality of templates are available, a best-fit template of the plurality of templates may be identified through comparison with the document model prior to segment identification. In other embodiments, the structure-dependent function may comprise table of contents information and/or font properties within the document model.

Further still, the structure-dependent function may comprise an average segment size as determined according to previously identified segments in one or more additional documents that are related to the document under consideration. Each of the additional documents may correspond to known templates and/or comprise a table of contents used to determine segments in such additional documents. In a related embodiment, an average segment size may be determined based on previously identified segments within additional documents in a best-match document cluster for the document. The additional documents may be related to the document by virtue of similar storage characteristics, e.g., within the same directory.

Having identified segments in accordance with such techniques, semantic-content dependent functions may be applied to further refine the analysis by identifying sub-segments within the extracted segments, or by identifying segments that may be properly merged according to the similarity of their respective semantic content. The present invention also describes appropriate apparatuses that implement the various methods for segmenting documents based on one or more structure-dependent functions.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 2:
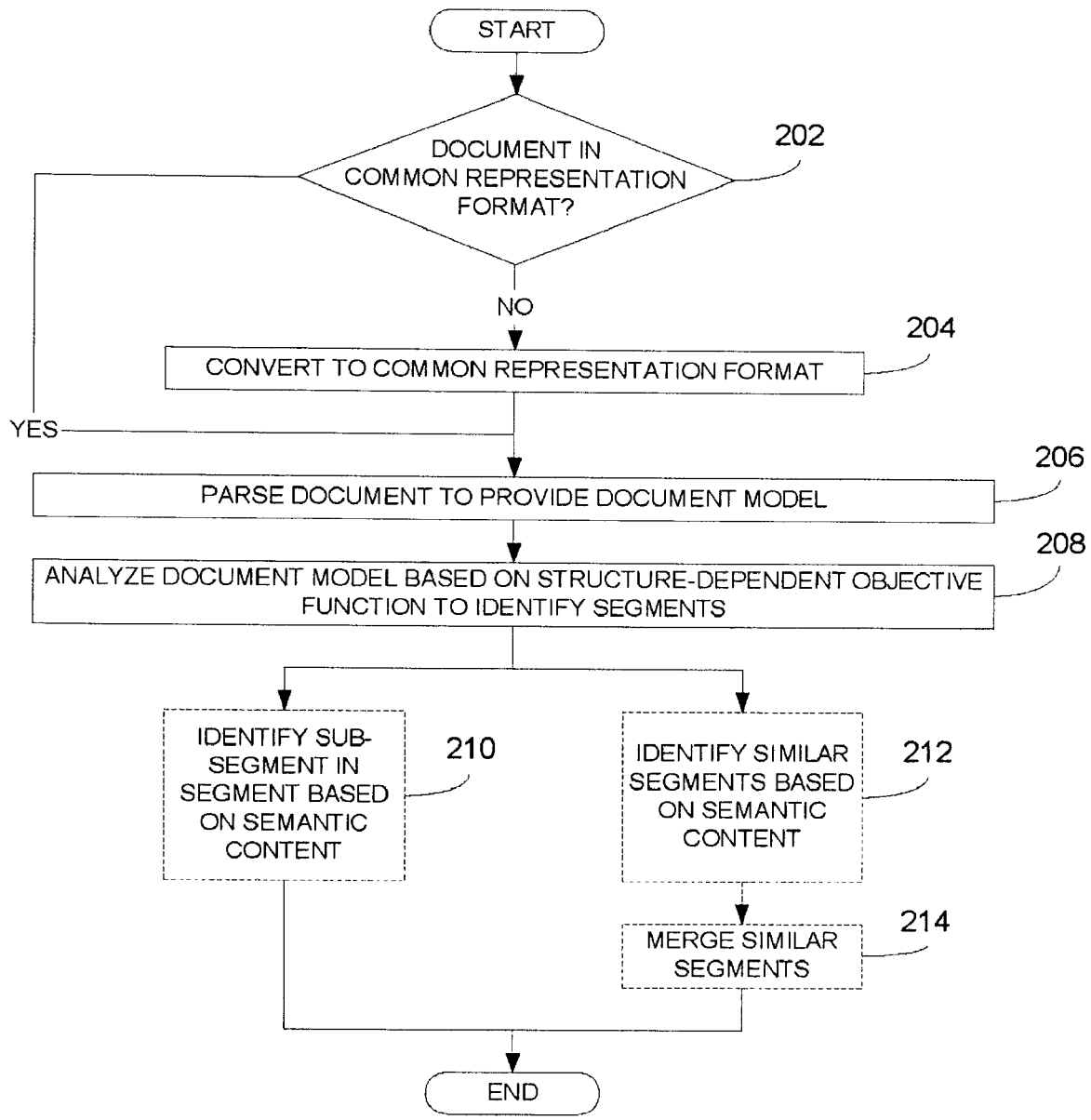
FIG. 2 is a flow chart illustrating processing for determining segments within a document in accordance with the instant disclosure.
Figure 5:
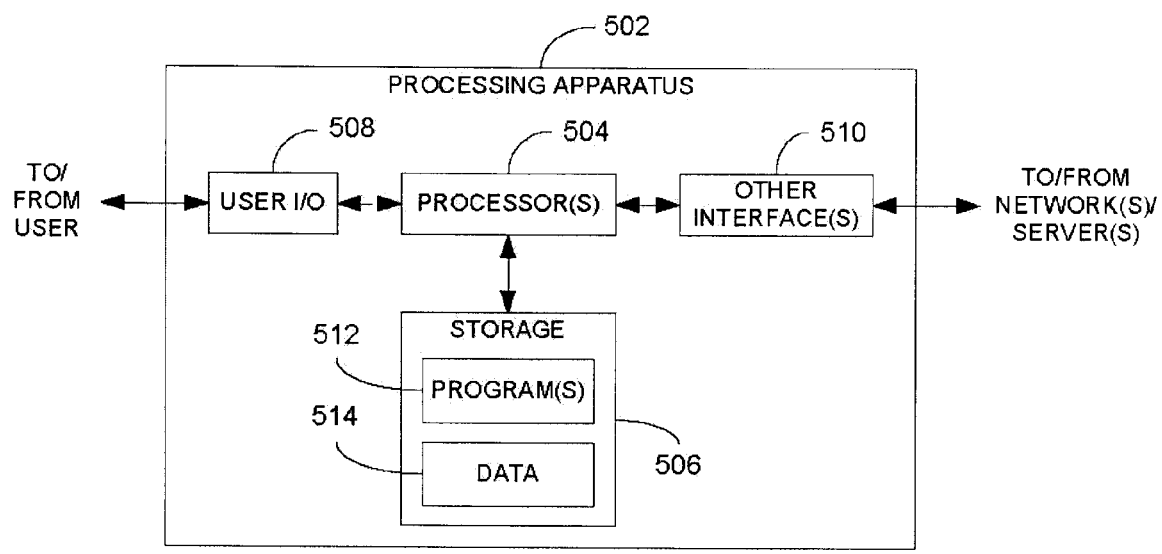
FIG. 5 is a block diagram of a processing apparatus that may be used to implement the various embodiments described herein.
Figure 4:
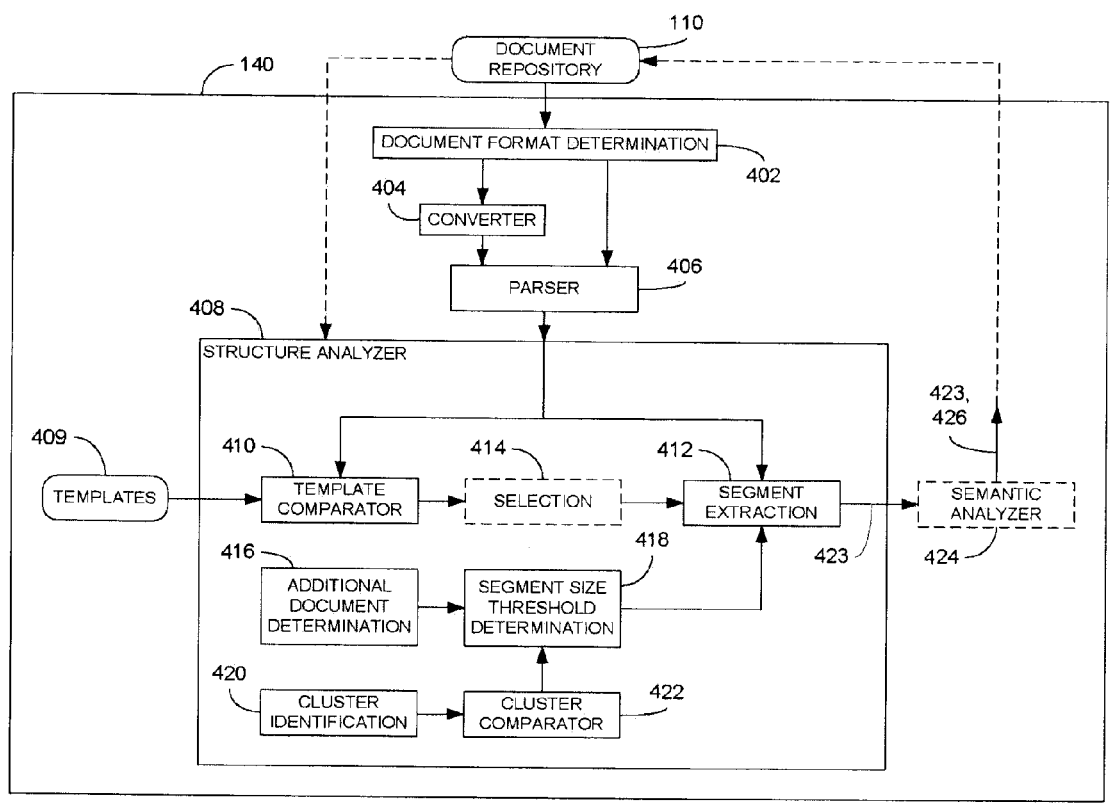
FIG. 4 is a block diagram of an apparatus for determining segments within a document in accordance with the instant disclosure.

Referring now to FIG. 2, processing for segment determination within a document in accordance with the instant disclosure is further described. The processing illustrated in the FIG. 2, and as described herein, may be performed by an apparatus as illustrated in FIG. 4, as described in further detail below and/or by a processing apparatus 502 executing suitable programming instructions stored in the storage device(s) 506 as shown in FIG. 5. Those having skill in the art will appreciate that other, suitably configured devices may be equally employed for this purpose.

Regardless, processing begins at block 202 where it is determined whether a given document is already in a common representation format. As used herein, a document may comprise any uniquely identifiable, electronically represented data stored in a suitable repository. For example, documents to be subjected to segmentation processing may be designated according to a user's input (e.g., using a graphical user interface, as known in the art) as residing within one or more particular file directories within the repository. Techniques for locating and retrieving documents stored in repositories are well known in the art and are therefore not described in detail herein.

Examples of documents include, but are not limited to, text files, spreadsheets, presentations, diagrams, ad hoc databases, programming code, etc. Depending on the particular scenario, the documents available in the repository may be encompassed by a relatively small number of different document types, as in the case, for example, of documents produced by a business entity using Microsoft "OFFICE" authoring tools, such as the "WORD" word processing application, "EXCEL" spreadsheet application, "POWERPOINT" presentation application, "VISIO" illustrating application, etc. The common representation format comprises a generic data representation format that may be used to embody any of the available document types. For example, in the case of documents authored using Microsoft "OFFICE" authoring tools, the documents may be represented according to the so-called Office Open XML (OOXML) file format described in the joint International Standard, ISO/IEC 29500:2008, Information technology—Document description and processing languages—Office Open XML file formats. As known in the art, an OOXML document file comprises mainly XML (Extensible Markup Language) based files and a relationship file indicating the relationships between the XML files compressed within a zip package. Depending on the type of the document, OOXML files have different internal directory structures and names. An application operating upon an OOXML file will use relationships files to locate individual sections (files), with each having accompanying metadata. Those having skill in the art will appreciate that other common representation formats, such as ODF (Open Document Format), may be equally employed in the context of the instant disclosure as a matter of design choice. Regardless of the particular format used, a document under consideration is inspected at block 202 to determine whether it is already embodied according to the common representation format. For example, in the case of OOXML, the file extension of the document may be inspected, i.e., a word processing document in OOXML format would have the ".docx" file extension. Further, parsers can be employed to check the validity of the document in the common representation format.

If the document under consideration is not in the common representation format, processing continues at block 204 where the document is converted into the common representation format. Techniques for converting documents into a common representation format are well known in the art. For example, in the case of documents prepared with older versions of "MICROSOFT" authoring tools (i.e., having representations that do not conform to OOXML), an appropriate converter, such as the Office File Converter (OFC) provided by Microsoft Corp., is used to convert the document into OOXML. Such converters typically comprise software programs that, when executed, perform the necessary conversion operations on a designated document or set of documents.

Alternatively, where a converter is not readily available, an appropriately configured parser may be employed to convert the document into the common representation format. As known in the art, parsers typically implement a grammar or a set of rules. When a document is parsed, it is determined by the parser which of the rules of the grammar is satisfied, thereby causing that rule to be associated with that part of the document satisfying it. In the case of a converter, the grammar may also include further translation rules to convert the document into the common representation format. That is, parsers can be defined for specific types of documents wherein the grammar rules can be defined with all the properties of the particular document format (placements, position, font, etc.) and instructions how to translate into the common representation format. As known in the art, parsing generally includes traversing the content of a document to identify occurrences of specific symbol strings or tokens, and outputting such tokens. Normally, in the context of software development, for example, the resulting tokens are then syntactically processed to identify particular expressions corresponding to known operations, which expressions are subsequently semantically analyzed to generate machine-executable expressions or code. In the instant context, however, the tokens are instead analyzed to identify structures within the document. For example, in the case of a text document, the tokens are analyzed to identify paragraphs, headings, different fonts, etc. in order to find those portions of the document corresponding to the schema established by the common representation format. In a similar manner, other parsers may be established for other document types, e.g., spreadsheets, graphics files, presentations, etc.

Referring once again to FIG. 2, regardless whether the document is provided in or converted into the common representation format, processing continues at block 206 where the document is parsed to provide a document model. As used herein, a document model is a data construct specific to a given document used to facilitate segmentation decisions concerning that document. In one embodiment, document models are arranged in accordance with the internal structure of a document, thereby more readily implementing segmentation determinations based on structural features. The internal structure of a document refers to indicia suggesting a physical and/or logical separation of given portions of the actual semantic content of the document. For example, in the case of a word processing document, indicia such as headings, paragraphs, section breaks, etc. each give rise to the potential inference that the underlying text delimited by such indicia can be treated separately for purposes of segmentation.

Figure 3:
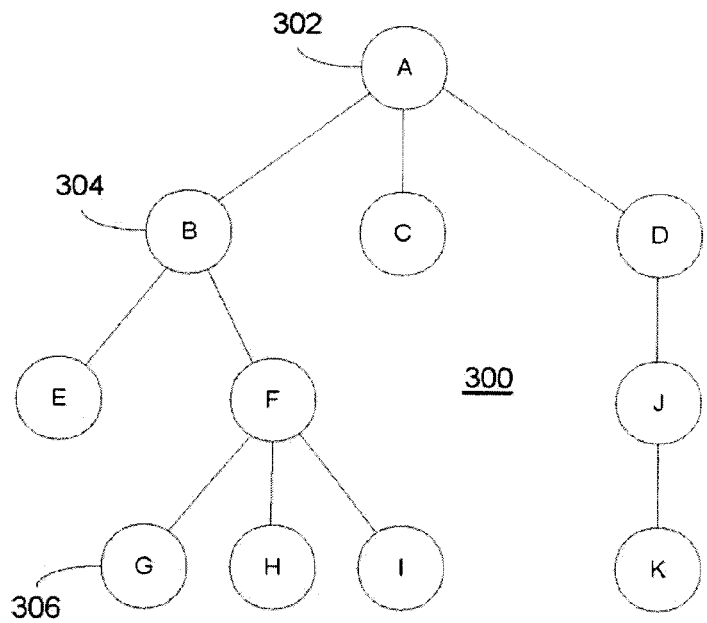
FIG. 3 is a schematic illustration of a representative tree structure that may be used as a document model in accordance with various embodiments described herein.

In one embodiment, document models are represented as tree data structures, an example of which 300 is illustrated in FIG. 3. As known in the art, a tree data structure 300 typically comprises a root node 302 connected to one or more child nodes comprising internal or inner nodes 304 and leaf nodes 306. Leaf nodes 306 are nodes that do not have any child nodes depending therefrom, whereas internal nodes 304 are nodes that do have child nodes. Any given node may contain a value or a condition or represent a separate data structure or a tree of its own. For example, in the case of a word processing document, the root node would be a topmost reference to the document as a whole, whereas the first level of child nodes (e.g., nodes B-D) would be, for example, the uppermost headings in the document. Below each "heading" node, further child nodes might represent either paragraphs (e.g., node E) or sub-headings (nodes F & J) that subsequently lead to other nodes (e.g., nodes G-I and K, respectively) that represent sentences or words. As another example, in a "POWERPOINT" presentation, the root node depicts the entire set of presentation slides, whereas its children (e.g., nodes B-D) represent individual slides. Within each slide, sub-trees (e.g., nodes F-I) represent a group (composite) object in the slide in which the children nodes are the objects constituting the group.

When segmenting source code (e.g., documents written in programming languages like C, "JAVA", etc.), it is possible to use the native parsers of these languages and segment those documents at the abstract syntax tree level (AST level). Here again, we have a hierarchical representation of the document in the form of a tree. In this specific case, semantic information of the contents such as method declaration, method invocation, etc. may be extracted to assist in defining the boundaries of segments.

Once the document model for a document has been established, the processing according to FIG. 2 may proceed to block 208 where the document model is analyzed according to one or more structure-dependent functions in order to identify segments within the document. A structure-dependent function is any function (or rule) that bases segmentation decisions off of structural features of a document. In contrast, a semantic content-dependent function bases segmentation decisions off of an understanding (however developed) of the semantic meaning of the materials being segmented, i.e., the meaning of the material (or an approximation thereof) to a person.

Where the document model is represented as a tree data structure, as described above, segments may be identified according to the particular node structure in the document model. That is, a segment may be identified as any portion of the tree structure ranging from a single leaf node up to a sub-tree, i.e., an internal node and its children. Further processing may be applied to any segment thus identified to determine whether further splitting of a previously-identified segment is required or, on the other hand, whether previously-identified segments need to be merged. As described in greater detail below, various structure-dependent functions may be used to this end, including the availability of document templates, table of contents, font properties or the segments of additional documents related to the document under consideration. Each of these various structure-dependent functions may be used separately or in combination with the other functions when making segment determinations.

In one embodiment, the structure-dependent function comprises comparison of the document model with a document template followed by segmentation based on matching properties between the document model and the template. In this case, the intuition is that documents often follow a certain pattern (template) that provides additional meta-information about the content/nature of the document. Templates may be considered according to a hierarchy of template types of increasing complexity. Thus, at a first level, documents are prepared using a native template of the authoring application, for example, a design template of the "POWERPOINT" application. Furthermore, within a particular design template, there can be customizations done for specific need. For example, templates that cater to different perspectives (say, projects, stake holders, status update etc) pertaining to a large, corporate entity may be created. In the case of "WORD" documents, templates are typically different for different types of documents, e.g., the requirements document of a software project has a different template compared to a design document. Regardless of the particular form or intended use of a template, appropriate structural cues for use in segmentation should be readily determinable given the well-defined understanding of such templates. For documents that have an associated template, a comparison is performed between the document model and template. Where the document and template are depicted as tree data structures, any of a number of known tree comparison or graph matching algorithms may be employed. For example, the so-called QMatch algorithm, described in "QMatch—A Hybrid Match Algorithm for XML Schemas", K. T. Claypool et al., Proceedings of the 21st International Conference on Data Engineering (ICDE '05), may be used for this purpose. In particular, properties of the document and the template may be compared to determine whether matching properties exist. Such properties may include, by way of non-limiting example, labels, sets of properties, children, nesting levels, etc. as designated by XML tags or, as further example, properties of text (i.e., font type, font size, etc.) at or below a given node. Values for each these properties can be determined and compared to identify where matches exist between the document and the template. On finding a match, the document is segmented based on the structure of the template corresponding to the matching properties. For example, if a document under consideration includes headings specified in the template as determined by matching nodes/sub-trees (i.e., the document and the template exhibit an isomorphic relationship), then those portions of the document delimited by the headings may be designated as segments.

It is noted that the type of comparison to be employed when using the document model determines the manner in which the document model is used. That is, the nature of the comparison determines what level of abstraction within the document model is used. For example, a given template may abstract a document down to the sub-section level. In this instance (and assuming a tree structure for the document model), all nodes in the document model below the sub-section (i.e., sub-subsection, etc.) level are ignored when doing a template match. Where an XML-based equivalent of a document is employed, a very fine grained tree description is possible, e.g., the leaves of the tree would be the words in the document whereas nodes immediately above the leaves would be sentences, etc. In this case, a comparison based on font properties (as described below) could extend down to the level of leaves within the document mode, i.e., the level of abstraction employed depends on the nature of the comparison being used.

At a second level, documents are prepared according to a template unique to a given user or organization. Such custom templates, while unique, are typically sufficiently well understood by the user/organization as to readily support segment determination. The use of custom templates may additionally consider whether such templates were prepared according to standard design procedures, e.g., chapter, section, paragraph, etc. Alternatively, such custom templates may be based on implicit assumptions made for the standard design templates. For example, a user/organization might choose different font properties (such as size, style, indentation, etc.) for distinguishing different aspects in a document. Knowledge of such explicit or implicit assumptions allows custom templates to serve as suitable bases for making segmentation determinations. The same techniques described above for finding matching properties with standard templates may also be applied to custom templates when making segmentation decisions.

At a third level, it may not be possible to readily identify a single template corresponding to the document. However, it may be possible to establish that the document is based on or at least partially satisfies one of several available templates. In this case, a plurality of candidate templates are compared with the document model (using, for example, the above-described graph matching techniques) to identify matching properties for each candidate template. Thereafter, a best-fit template of the plurality of candidate templates is determined based on the matching properties for each candidate template. For example, the candidate template having the highest number of matching properties, or the candidate template having the most matching properties for the most relevant properties (e.g., matching chapter headings versus matching font properties), can be chosen as the best-fit template. Having identified the best-fit template in this manner, segmentation proceeds based on the matching properties between the best-fit template and the document model, as described above.

In another embodiment, the structure-dependent function comprises the use of table of contents information to segment the document. A table of contents in a document is an indication of the natural separation of concepts established by the author and, as such, may be a useful basis for making segmentation decisions. However, experience has shown that a table of contents in a given document may have been prepared in a manual fashion after the document has been completed, i.e., not generated in an automated way. As such, it is often the case that the table of contents may not be the best match for the segmentation of the document according to the actual structure of the document. Thus, in an embodiment, rather than relying strictly on a table of contents, a double filtering process may be employed whereby the actual structural properties of the document, beyond those established by the table of contents, are examined using the other techniques described herein to verify or modify segmentation that would otherwise occur if based solely on the table of contents. For example, where a table of contents (or portions thereof) strongly agrees with the actual structure of a document, then segmentation directly based on the table of contents may be sufficient. However, where actual structure of a document differs markedly from the table of contents, the table of contents may be considered more advisory in nature, or ignored altogether, in favor of the structurally-based demarcations of segments when making segmentation decisions.

In another embodiment, the structure-dependent function is based on font properties indicated in the document model. In this scenario, portions of the document exhibiting similar font properties, such as font size, font style, formatting (e.g., boldface, underline, italics, etc.), line spacing, etc. are identified. In one embodiment, when creating the document model as a tree data structure, those portions of the document exhibiting certain font properties, such as the smallest font used in the document, may be considered leaves within the tree. Those portions of the document having additional or different font properties and enclosing or bounding the lower level portions may be designated as parent nodes (i.e., inner nodes) of the leaves. This "bottom-up" approach to building a tree structure may be repeated until all portions of the document are accounted for. Thereafter, segmentation according to any desired level of sub-trees may be performed to derive the segments.

In yet another embodiment, the structure-dependent function is based on the segments of additional documents related to the document under consideration. In this instance, a segment size threshold (e.g., an average segment size) is automatically derived based on previously determined segments in the additional documents. In an embodiment, this approach is utilized in those cases where the above-described structure-dependent functions (i.e., template based, table of contents based, font properties based) are not readily applicable. The rationale behind this embodiment is the significant likelihood that the additional, related documents will follow a similar trend even though a few of them do not follow any template. The size for segmenting such documents would be derived based on the properties of the other documents and their corresponding segments.

The manner in which the segment size threshold is determined depends in part upon identification of the additional documents used. Thus, in one embodiment, the additional documents are drawing from a directory in which the document under consideration resides. In this case, there is a presumption that the documents stored in same directory have a significant likelihood of being highly related (at least in terms of internal structure) to the document under consideration. For example, where the documents reside in a file folder system, the additional documents may be taken from the folder in which the target document resides. In this case, those documents in the same directory having correspondence to a template (as described above) are used as the additional documents. In those instances in which there are separate sets of documents, each set corresponding to a different template, a best-fit template is first determined as described above, with the additional document thereafter corresponding to the best-fit template. Having identified one or more additional documents in this manner, the segment size threshold is determined based on the previously identified segments in the additional documents. In one embodiment, the threshold is simply the average size of the segment in terms of, for example, the number of words or lines in each of the various segments thus identified. Those having skill in the art will appreciate that other properties of segments may be used to determine an average value and, furthermore, that other techniques for determining the threshold, e.g., using the median or mode for the collective segment sizes, may be equally employed.

In another embodiment, the additional documents are drawn from a larger, and therefore likely more diverse, sample of documents such as from an entire repository. In this case, the assumption that the additional documents throughout the entire repository are highly related to the document in question begins to break down. As such, it is desirable to first characterize the documents in the repository and then use those documents having the most similar characteristics to the target document as the additional documents. For example, for those documents in the repository that have been previously segmented, various properties of the documents are collected such as document size, number of words, number of paragraphs, number of tables, inclusion of a table of contents, lowest outline, titles, authors, etc. Thereafter, these document properties are used to create clusters of documents based on similarity of any desired document property or combination of properties. Typically, clustering algorithms can be classified as hierarchical or partitional techniques. In the context of the instant disclosure, specific algorithms drawn from either type of clustering techniques may be employed. By way of non-limiting example, in one embodiment, the well-known k-means algorithm (drawn from the partitional class of techniques) may be employed. With the various possible clusters identified, the document under consideration is then compared with the various clusters using the same or alternative clustering techniques described above to determine which cluster the document is most closely related. For example, one can take a centroid of a given cluster as a representative thereof and then associate a document to that cluster whose centroid has a smallest distance with the document. Alternatively, one can find the document that is closest to the new data item and associate the document under consideration to that cluster corresponding to the closest document. Thereafter, the segment size threshold (as described above) for the cluster is determined and applied to the document under consideration.

Referring once again to FIG. 2, once the determination of the segments has been completed, processing may optionally continue to either block 210 and/or 212, where the now-determined segments may be further analyzed to determine whether splitting or merging of the identified segments is desired. As noted above, segments are determined in order to establish links between documents. However, such links may be made more reliable through splitting of segments. For example, a first segment, S1, might consist of content that talk about both the transaction manager and a financial advisor in a financial domain requirements document. The similarity of S1 with a second segment, S2, which only talks about the transaction manager may be compromised. In this case, it would be desirable to split S1 into two smaller sub-segments, S1$a$ and S1$b$, dealing separately with the transaction manager and the financial advisor, respectively, such that the similarity between S1$a$ and S2 would be more significant.

Alternatively, it is noted that the number of links between a set of segments is quadratic to the number of segments formed, thus imposing a huge requirement on computational complexity. Thus, it may be desirable to reduce the number of segments by merging some of the consecutive segments. One choice to merge segments can be based on the similarity between consecutive segments. For example, let S1, S2 and S3 be the segments obtained by applying the above-described techniques to a document D1. Further, assume the similarity between S1 and S2 is significantly greater than the similarity between S2 and S3, and between S1 and S3. In this case, because S1 and S2 have high similarity (i.e., that they have semantically similar content), it would be advantageous to merge S1 and S2 thereby reducing the total number of segments. The identification of similar segments may be performed in an automatic fashion or through user feedback. In this case, the segments are provided to a user in any suitable form (e.g., through a graphical user interface or the like) such that the user can indicate specific segments to be merged. (Of course, such user feedback could also be used to identify segments that should be split.)

Thus, at block 210, one or more sub-segments within a given segment may be identified based on semantic content of the segment. Various semantic analysis techniques known in the art may be employed for this purpose, such as latent semantic analysis (LSA) described, for example, in U.S. Pat. No. 4,839,853 or latent Dirichlet allocation (LDA). In LSA, the contents of a document are treated as a vector whose attributes are defined by the words in the document.

From a corpus of documents, the set of unique words in the entire corpus defines a vector space, thereby allowing systematic analysis of the analyzed documents. Through iterative applications of such techniques to previously identified segments (i.e., treating such segments as the corpus being considered), sub-segments may be further identified.

Alternatively, or additionally, processing may continue at block 212 where two or more segments are identified as being substantially similar in terms of their semantic content. To this end, the semantic analysis techniques described above can be used to identify semantically similar segments. Alternatively, even simpler techniques such as the degree of match between the two segments may be employed. Regardless how similarity between segments is determined, the decision to merge segments can be based on different criteria. For example, a simple threshold concerning the measured degree of similarity (e.g., the correlation between two vector representations) may be employed so that merger occurs when the threshold is exceeded. Alternatively, user-directed decisions may be employed. In this case, a user can indicate (through any suitable means such as a graphical user interface or the like) that s/he is interested in a particular topic and then be presented with segments determined to be related to that topic, or can be directly presented with a list of multiple segments and their contents. For example, in an embodiment, fine grained segments on a particular topic and coarse segments of other topics are presented. Based on the presented segments, the user can indicate which segments should be merged. Regardless of the manner in which they are determined, when sufficiently similar segments are identified, processing continues at block 214 where the similar segments are merged into a larger segment.

Referring now to FIG. 4, the segmentation tool 140 is illustrated in greater detail. In one embodiment, as noted above, the segmentation tool 140 may be implemented using a processing apparatus such as that illustrated in FIG. 5. Likewise, those having ordinary skill in the art will appreciate that hardware/software/firmware implementations may be equally employed as a matter of design choice. As illustrated, the core of the segmentation tool 140 comprises a parser 406 in communication with a structure analyzer 408. The parser 406, as described above, operates upon a document in the common representation format in order to produce a document model that is subsequently provided to and analyzed by the structure analyzer 408. The structure analyzer 408, using one or more structure-dependent objective functions as described above, identifies segments within the document based on its analysis of the document model. In between the document repository 110 and the parser 406, a document format determination component 402 is provided to determine whether a given document in the repository 110 is represented in the common representation format. In those cases where the document is in the common representation format, a direct link between the document format determination component 402 and the parser 406 is provided. Alternatively, where the common representation format is not already used, a converter 404 is provided in the path between the document format determination component 402 and the parser 406. Using the techniques described above, the converter 404 (which may, in fact, comprise another parser as previously noted) converts a given document into the common representation format as needed.

As illustrated, the structure analyzer 408 comprises a number of pathways whereby a given document from the repository 110 may be processed, ultimately leading to a segment extraction component 412. Using the above-described techniques, the segment extraction component 412 identifies segments based on analysis of the document model provided by the parser 406 according to additional inputs provided by one or more of the illustrated pathways. Thus, according to one pathway, a template comparator 410 is provided that, using the comparison techniques described above, compares the document model with one or more templates 409 to determine matching properties between a template and the document model. Note that the templates 409, which may comprise data structures stored in any suitable storage device(s), may be stored apart from the structure analyzer 408 as shown or, alternatively, locally relative to the analyzer 408. In this embodiment, a selection component 414 may be optionally provided that, as described above, operates to select a best-fit template of a plurality of templates based on matching properties between the document under consideration and the plurality of templates. Regardless, in this case, the segment extraction component 412 performs segment identification based on the (selected) template as described above.

The dashed line illustrated between the repository 110 and the structure analyzer 408 schematically (for ease of illustration) connections between the repository 110 and each of blocks 416 and 420. As shown, blocks 416 and 420 illustrate further, related pathways for analyzing a given document. In particular, an additional document determination component 416 is provided to determine, in an embodiment, one or more additional, related documents corresponding to the document being analyzed. As noted above, this can be performed on the basis of documents having similar storage characteristics as the target document. As shown, the additional document determination component 416 is coupled to a segment size threshold determination component 418 that, as described above, determines a segment size threshold based on properties of segments previously identified in the additional documents. In this case, the segment size threshold is passed to the segment extraction component 510 to determine segments based on the threshold.

Alternatively, where the segment size threshold is determined based on clusters of documents, as described above, a cluster identification component 420 is provided that implements one or more of the previously described cluster algorithms. The resulting clusters are then passed to a cluster comparator component 422 that identified a best-match document cluster accordingly. The cluster comparator component 422 is coupled, as shown, to the segment size threshold determination component 418 that, in this case, operates to determine the segment size threshold based on the best-match document cluster, as described above. Once again, the resulting segment size threshold is passed to the segment extraction component 412 to determine segments based on the threshold.

As further shown, the resulting segments 423 are provided as output of the structure analyzer 408. As illustrated by the additional dashed line, the segments 423 (or, at least, information indicative thereof) may be stored in the document repository 110 or other suitable storage device(s). Alternatively, the segments 423 may be provided to an optional semantic analyzer 424 that, as described above, performs semantic analysis on the segments 423 to determine whether any segments should be split and/or merged. Once again, the split/merged segments 426 may be provided to the repository 110 or other suitable storage device(s).

Figure 1:
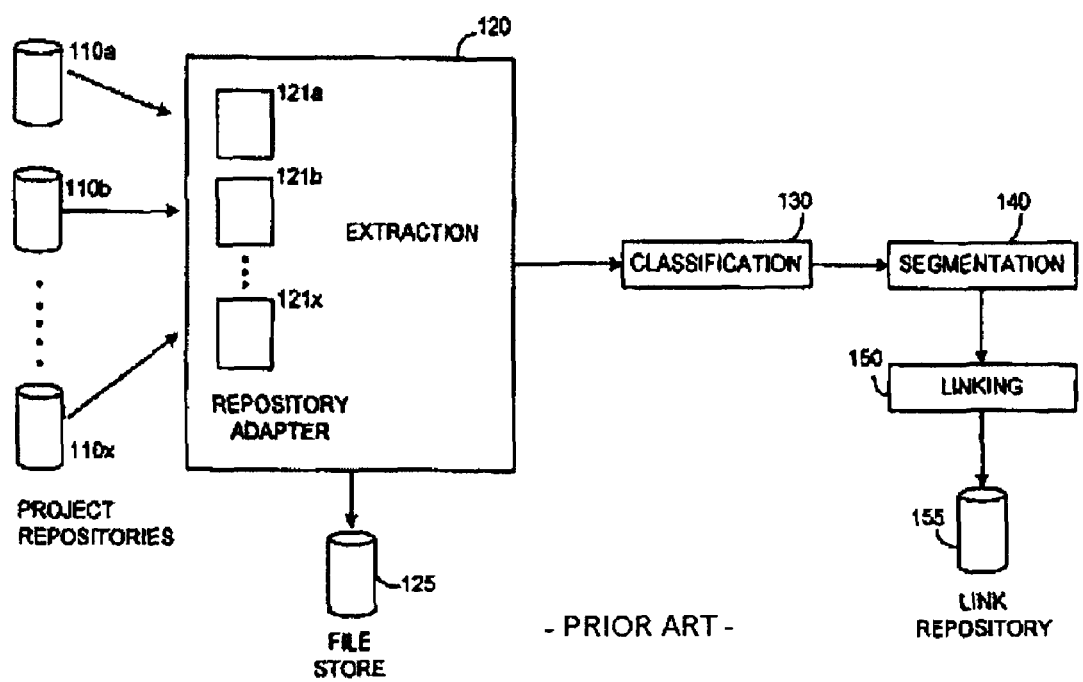
FIG. 1 is a block diagram of a prior art embodiment of a backend system for use with a repository navigation tool, and in which a segmentation component is provided for identifying segments within documents in a repository.

Referring now to FIG. 5, a processing apparatus 502, suitable for implementing processing in accordance with the instant disclosure is further illustrated. In particular, the processing apparatus 502 may be used to implement the processing described herein as part of the segmentation tool 140. Further still, the processing apparatus may be used to implement additional components illustrated in FIG. 1, e.g., the classification tool 130 and/or linking tool 150, as a matter of design choice. As shown, the processing apparatus 502 comprises one or more processors 504 in communication with one or more storage devices 206. As known in the art, the processor(s) 504 may comprise a microprocessor, microcontroller, digital signal processor, co-processor or other similar devices known to those having ordinary skill in the art.

In a similar vein, the storage devices 506 may comprise any suitable combination of volatile and/or nonvolatile memory such as random access memory (RAM) or read only memory (ROM), respectively. Such storage devices 506 may be embodied using any suitable media such as magnetic or optical storage media including removable media such as floppy disks, compact discs, etc. Regardless, the storage device(s) 506 has stored thereon instructions (i.e., software) 212 that may be executed by the one or more processors 504 such that the processor(s) 504 implement the functionality described herein. Furthermore, the storage device(s) 506 has stored thereon data 514, such as operational variables, data structures and the like used by the software 512 as it is executed. It is further noted that, as known in the art, some or all of the software-implemented functionality may be implemented using firmware and/or hardware devices such as application specific integrated circuits (ASICs), programmable logic arrays, state machines, etc.

As further shown, the one or more processors 504 may be in communication with various user input/output devices 508 that allow a user of the processing apparatus 502 to interact therewith. For example, the user input/output devices 508 may comprise one or more display screens, keyboards, user selection devices (e.g., a mouse and cursor combination, a touch screen, voice recognition interfaces, etc.), speakers, microphones, etc. The one or more processors 504 may also be in communication with other interfaces 510 that provide one or more communication interfaces between the processing apparatus 502 and external devices, such as a network, other processing devices, peripheral equipment, etc. The nature of the other interfaces 510 necessarily depends on the external devices with which the processing apparatus 502 communicates. For example, where the processing apparatus 502 is coupled to a network via a wired connection, the interfaces 510 may comprise the software, firmware and/or hardware necessary to terminate the relevant network protocols. Similarly, where the processing apparatus 502 communicates with a wireless network, the interfaces 510 may comprise the components needed to terminate the wireless protocol. Once again, those having skill in the art will appreciate that various implementations are possible, and that the present invention is not limited in this regard.

As described above, the instant disclosure describes various techniques for determining segments in a document. This is achieved through the analysis of documents models, derived from documents represented in a common representation format, according to one or more structure-dependent functions. Further still, the resulting segments may be further split and/or merged as desired to achieve optimal segmentation. For at least these reasons, the above-described techniques represent an advancement over prior art teachings.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for determining segments in a document, comprising:
   when the document is in a common representation format that supports discovery of internal structure of the document, parsing the document, by a parser implemented by a computer, to provide a document model; and
   analyzing the document model, by a structure analyzer implemented by the computer and in communication with the parser, based on at least one structure-dependent function to provide a plurality of segments.

2. The method of claim 1, further comprising:
   when the document is not in the common representation format, converting the document, by a converter implemented by the computer, into the common representation format to provide a converted document; and
   parsing the converted document, by the parser in communication with the converter, to provide the document model.

3. The method of claim 1, wherein analyzing the document model based on the at least one structure-dependent function further comprises:
   comparing the document model with a template corresponding to the document, by a comparator implemented by the computer and in communication with the parser, to identify matching properties between the document model and the template; and
   identifying, by a segment extraction component implemented by the computer and in communication with the comparator, the plurality of segments based on the matching properties.

4. The method of claim 1, wherein analyzing the document model based on the at least one structure-dependent function further comprises:
   for each of a plurality of candidate templates, comparing the document model with the candidate template, by a comparator implemented by the computer and in communication with the parser, to identify matching properties between the document model and the candidate template;
   identifying a best-fit template of the plurality of templates, by a selection component implemented by the computer and in communication with the comparator, based on the comparison of the document model with each of the plurality of candidate templates; and
   identifying the plurality of segments, by a segment extraction component implemented by the computer and in communication with the selection component, based on the matching properties between the document model and the best-fit template.

5. The method of claim 1, wherein analyzing the document model based on the at least one structure-dependent function further comprises:
   identifying the plurality of segments, by a segment extraction component implemented by the computer and in communication with the parser, based on table of contents information in the document model.

6. The method of claim 1, wherein analyzing the document model based on the at least one structure-dependent function further comprises:
   identifying the plurality of segments, by a segment extraction component implemented by the computer and in communication with the parser, based on font properties in the document model.

7. The method of claim 1, wherein analyzing the document model based on the at least one structure-dependent function further comprises:
   identifying at least one additional document related to the document by an additional document determination component implemented by the computer;
   determining, for previously identified segments in the at least one additional document, a segment size threshold by a segment size threshold determination component implemented by the computer and in communication with the additional document determination component; and
   identifying the plurality of segments based on the segment size threshold by a segment extraction component implemented by the computer and in communication with the average segment size determination component.

8. The method of claim 7, wherein each of the at least one additional document corresponds to a known template or comprises a table of contents used for segmentation of the at least one additional document.

9. The method of claim 1, wherein analyzing the document model based on the at least one structure-dependent function further comprises:
   identifying by a cluster identification component implemented by the computer, for a plurality of additional documents within a document repository in which the document is stored, a plurality of document clusters based on properties of the plurality of additional documents;
   identifying, by a cluster comparator component implemented by the computer and in communication with the cluster identification component, a best-match document cluster of the plurality of document clusters for the document;
   determining, for previously identified segments in those additional documents in the best-match document cluster, a segment size threshold by a segment size threshold determination component implemented by the computer and in communication with the cluster comparator component; and identifying the plurality of segments based on the segment size threshold by a segment extraction component implemented by the computer and in communication with the average segment size determination component.

10. The method of claim 1, further comprising:
identifying, by a semantic analyzer implemented by the computer and in communication with the structure analyzer, in a segment of the plurality of segments, a subsegment based on semantic content of the segment.

11. The method of claim 1, further comprising:
identifying, by a semantic analyzer implemented by the computer and in communication with the structure analyzer, at least two segments of the plurality of segments having sufficiently similar semantic content such that the at least two segments may be merged to provide a merged segment.

12. An apparatus for determining segments in a document, comprising:
a parser operative to create a document model based on the document when the document is in a common representation format that supports discovery of internal structure of the document; and
a structure analyzer, in communication with the parser, operative to determine a plurality of segments based on at least one structure-dependent function applied to the document model.

13. The apparatus of claim 12, further comprising:
a converter operative to convert the document into the common representation format to provide a converted document,
wherein the parser is further operative to create the document model based on the converted document.

14. The apparatus of claim 12, the analyzer further comprising:
a comparator operative to evaluate the document model relative to a template corresponding to the document to identify matching properties between the document model and the template; and
a segment extraction component, in communication with the comparator, operative to identify the plurality of segments based on the matching properties between the document model and the template.

15. The apparatus of claim 12, the analyzer further comprising:
a comparator operative to evaluate the document model relative to each of a plurality of candidate templates to identify matching properties between the document model and the candidate template;
a selection component, in communication with the parser, operative to identify a best-fit template of the plurality of templates based on the matching properties of the document model and each of the plurality of candidate templates; and
a segment extraction component, in communication with the selection component, operative to identify the plurality of segments based on the matching properties between the document model and the best-fit template.

16. The apparatus of claim 12, the analyzer further comprising:
a segment extraction component operative to identify the plurality of segments based on table of contents information in the document model.

17. The apparatus of claim 12, the analyzer further comprising:
a segment extraction component operative to identify the plurality of segments based on font properties in the document model.

18. The apparatus of claim 12, the analyzer further comprising:
an additional document determination component operative to identify at least one additional document related to the document;
a segment size threshold determination component, in communication with the additional document determination component, operative to determine a segment size threshold for previously identified segments in the at least one additional document; and
a segment extraction component, in communication with the segment size threshold determination component, operative to identify the plurality of segments based on the segment size threshold.

19. The apparatus of claim 12, the analyzer further comprising:
a cluster identification component operative to identify a plurality of document clusters based on properties of a plurality of additional documents within a document repository in which the document is stored;
a cluster comparator component, in communication with the cluster identification component, operative to identify a best-match document cluster of the plurality of document clusters for the document;
a segment size threshold determination component, in communication with the cluster comparator component, for determining a segment size threshold for previously identified segments in those additional documents in the best-match document cluster; and
a segment extraction component, in communication with the segment size threshold determination component, operative to identify the plurality of segments based on the average segment size threshold.

20. The apparatus of claim 12, further comprising:
a semantic analyzer, in communication with the structure analyzer, operative to identify, in a segment of the plurality of segments, a sub-segment based on semantic content of the segment.

21. The apparatus of claim 12, further comprising:
a semantic analyzer, in communication with the structure analyzer, operative to identify at least two segments of the plurality of segments having sufficiently similar semantic content such that the at least two segments may be merged to provide a merged segment.

22. A system comprising:
a document repository comprising a plurality of documents; and
a computer-implemented segmentation analyzer, in communication with the document repository, operative to:
when a document of the plurality of documents is in a common representation format that supports discovery of internal structure of the document, parse the document to provide a document model;
when the document is not in the common representation format, convert the document into the common representation format to provide a converted document; and
analyze the document model based on at least one structure-dependent function to provide a plurality of segments.

* * * * *